April 28, 1931.                O. FUNK                1,802,809
FREIGHT TRUCK
Filed Aug. 17, 1928          2 Sheets-Sheet 1
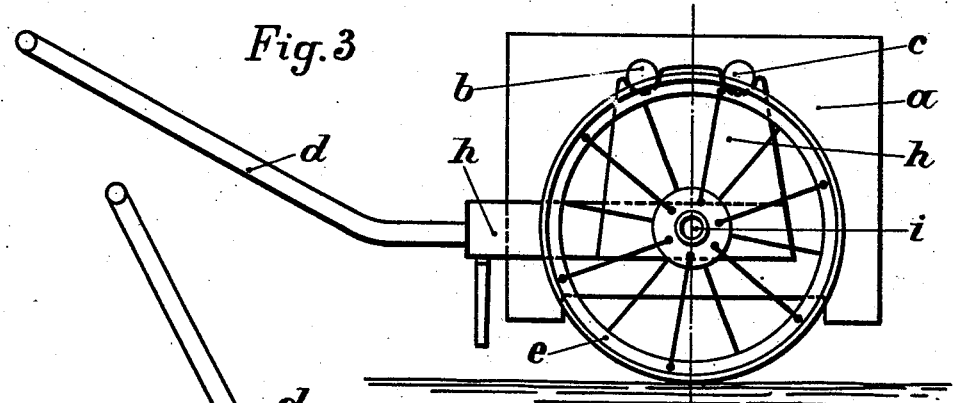
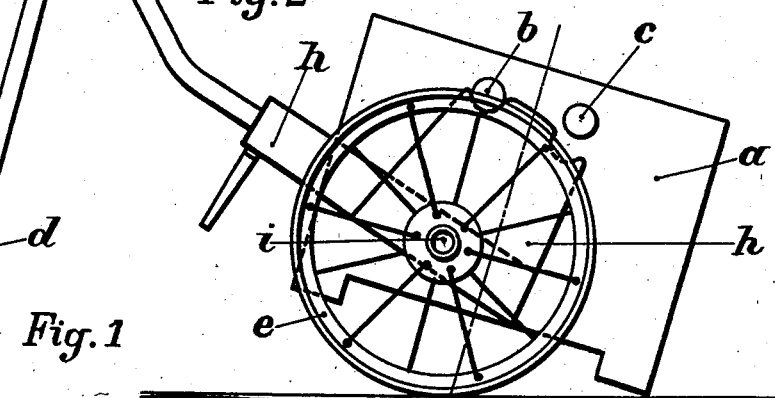
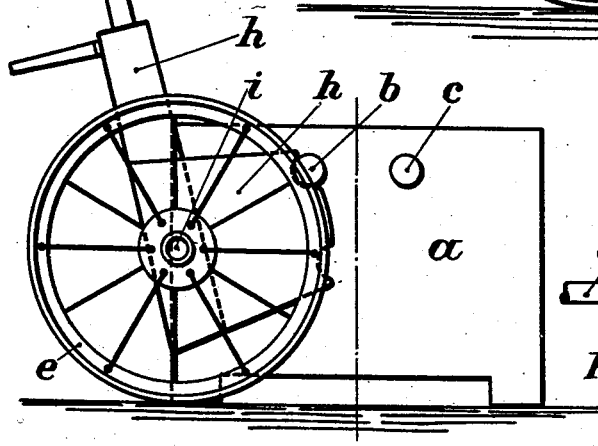
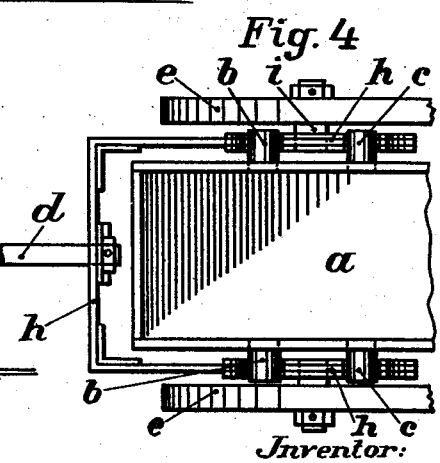
Inventor:

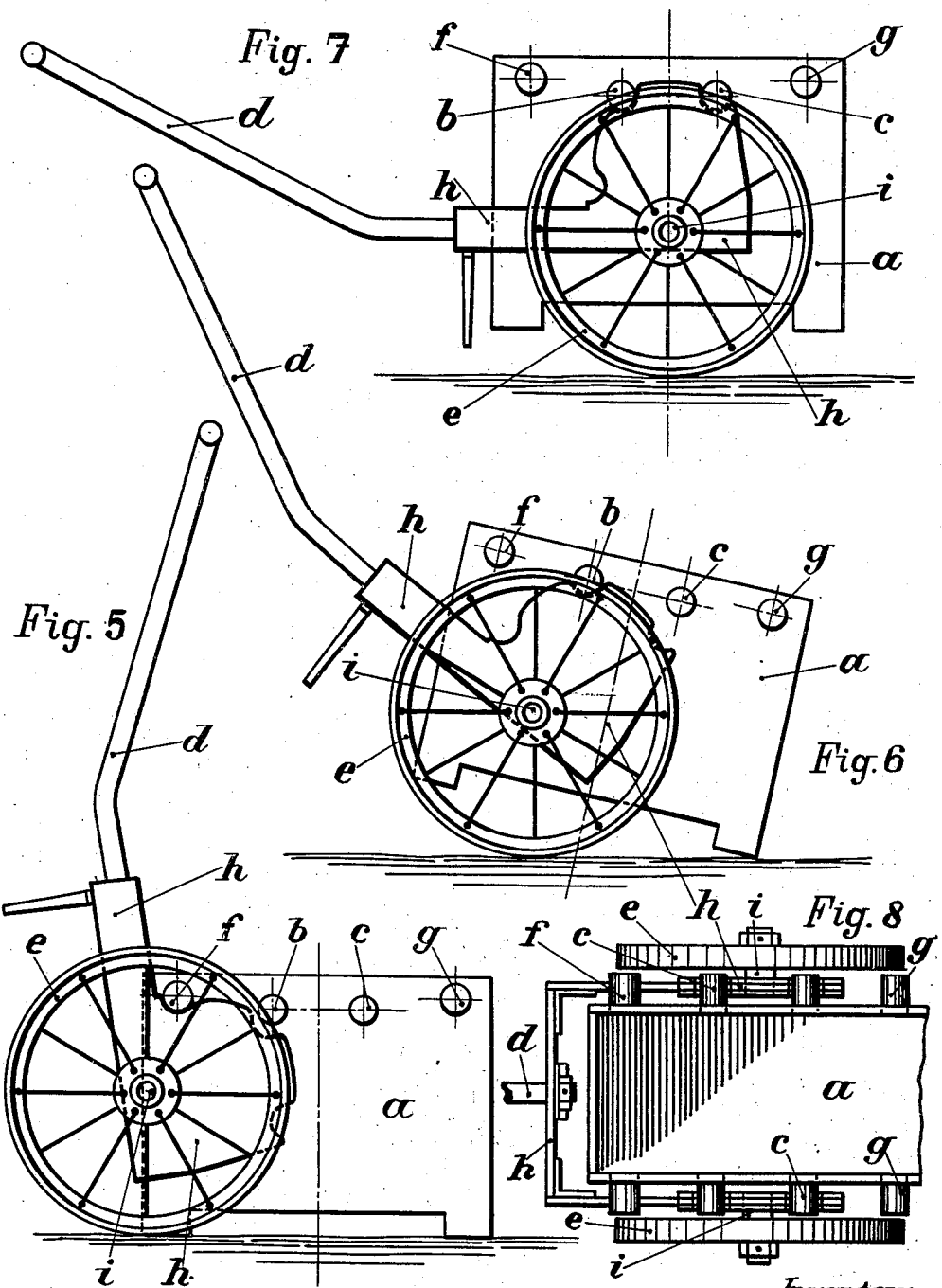

Patented Apr. 28, 1931

1,802,809

UNITED STATES PATENT OFFICE

OTTO FUNK, OF COLOGNE-MULHEIM, GERMANY

FREIGHT TRUCK

Application filed August 17, 1928, Serial No. 300,347, and in Germany February 1, 1928.

My invention relates to a hand-truck or trolley of the kind which will take up and deposit a container for the load by a simple movement of its handle and more particularly to a two-wheeled truck in which a frame being rigidly connected with a handle is tiltably mounted on the wheels.

The main object of my invention is to avoid a swinging motion of the container on the truck frame and a turning moment exerted by the load on the handle during the travel of the truck. Another object of my invention is to facilitate the taking up of the container by lifting it stepwise.

In the drawing two preferred embodiments of my invention are illustrated.

Fig. 1 is a side elevation showing the two-wheeled trolley in the position in which the raising of the container is initated.

Fg. 2 is a side elevation showing the container partly raised by tilting.

Fig. 3 is a side elevation showing the container fully raised and suspended by the frame of the trolley.

Fig. 4 is a plan view of a part of the aggregate consisting of the trolley and the container.

Figures 5, 6 and 7 are side elevations of a modification, such figures corresponding with the Figures 1, 2 and 3 respectively.

Fig. 8 is a plan view of a part of the modification.

According to Figs. 1–4 $a$ is a box-like container on each side of which two cylindrical projections $b$ and $c$ are provided. $h$ is a U-shaped frame which is connected with axles $i$ of wheels $e$ and with a handle $d$. The arrangement of the projections $b$ and $c$ is symmetrical with respect to a vertical plane dividing the container into equal portions in front and rear and passing through the axis of the wheels, when the container is suspended at its projections $b$ and $c$. In the frame $h$ supporting surfaces in the form of notches are provided which correspond with the projections $b$ and $c$ on each side of the container $a$. As soon as the handle $d$ with the frame $h$ is tilted into the position shown in Fig. 1, one of the notches on each side of the frame will engage the projection $b$ on each side of the container. When depressing the handle $d$ with the frame $h$, the container will first be partly raised by tilting as shown in Fig. 2, whereupon the other of the notches on each side of the frame will engage the projection $c$ on each side of the container, as shown in Fig. 3 according to which the container is fully raised and suspended by the frame $h$ of the truck. The depositing of the container is effected by reversing the manipulation.

As the arrangement of the projections $b$ and $c$ is symmetrical with respect to a vertical plane dividing the container into equal portions in front and rear and passing through the axis of the wheels, when the container is suspended at its projections $b$ and $c$ no turning moment is exerted on the handle by the load. Also swinging motions of the container on the trolley are avoided.

In the embodiment shown in Figs. 5 to 8 the elements and parts $a$, $b$, $c$, $d$, $e$, $h$ and $i$ correspond with those elements and parts designated in Figs. 1 to 4 by like reference-letters. According to Figs. 5 to 8 additional projections $f$ and $g$ are provided on each side of the container, and an additional notch is provided on each side of the frame $h$, such notches being adapted to engage the projections $f$ or the projections $g$, the latter in the case that the projections $g$ come into the position of the projections $f$. The projections $f$ or $g$ and the corresponding notches in the frame only serve for initiating the tilting and partial raising of the container, as shown in Fig. 5. When further depressing the handle $d$ with the frame $h$, the projection $f$ comes out of engagement with the corresponding notch, and in the same time the projection $b$ is engaged by the corresponding notch, as shown in Fig. 6. At the end of the manipulation also the projection $c$ is engaged by the corresponding notch, so that the container is only suspended at its projections $b$ and $c$, whereas the projections $f$ or $g$ remain inoperative during the travel of the truck.

What I claim is:

1. In a truck the combination of a hand-trolley comprising a pair of wheels and a U-shaped frame being tiltably mounted on said wheels and rigidly connected with a handle, said frame having on each side notches adapted to be raised and lowered by depressing and lifting the handle, with a separate container having on each side cylindrical projections adapted to be engaged by said notches for raising the container clear of the floor and suspending it, at least one of said cylindrical projections and the cooperating notch on each side of the container and the trolley-frame serving only for initiating the raising motion, such parts being out of engagement with one another, while the container is operatively suspended.

2. In a truck the combination of a hand-trolley, substantially comprising a pair of wheels and a frame tiltably mounted on said wheels and having on each side a plurality of supporting surfaces adapted to be raised and lowered by tilting the frame, with a separate container having on each side a plurality of projections adapted to be engaged by said supporting surfaces of the hand-trolley for raising the container clear of the floor and suspending it, two of said projections on each side of the container and the corresponding supporting surfaces of the trolley being operative during the travel of the truck, the said two projections on each side of the container being arranged symmetrically with respect of a vertical plane dividing the container into equal portions in front and rear and passing through the axis of the wheels when the container is in its operatively suspended position.

3. In a truck the combination of a hand-trolley comprising a pair of wheels and a U-shaped frame tiltably mounted on said wheels and rigidly connected with a handle, said frame having on each side a plurality of notches adapted to be raised and lowered by depressing and lifting the handle, with a separate container having on each side a plurality of cylindrical projections adapted to be engaged by said notches for raising the container clear of the floor and suspending it, two of said cylindrical projections on each side of the container and the corresponding notches of the trolley being operative during the travel of the truck, the said two cylindrical projections being arranged symmetrically with respect of a vertical plane dividing the container into equal portions in front and rear and passing through the axis of the wheels, when the container is in its operatively suspended position.

4. In a truck the combination of a hand-trolley substantially comprising a pair of wheels and a frame being tiltably mounted on said wheels and having on each side a plurality of supporting surfaces adapted to be raised and lowered by tilting the frame with a separate container having on each side a plurality of projections adapted to be engaged by said supporting surfaces for raising the container clear of the floor and suspending it,—the outermost pair of projections and cooperative supporting faces serving only for raising a part of the container weight by initiating the tilting action, the whole container weight being supported by two pairs of projections on the completion of tilting action, so that the vertical plane dividing the container in equal portions passes through the axis of the wheels.

OTTO FUNK.